United States Patent
Moser et al.

(10) Patent No.: US 12,442,447 B2
(45) Date of Patent: Oct. 14, 2025

(54) METHOD AND CONTROL DEVICE FOR OPERATING A TRANSMISSION

(71) Applicant: ZF Friedrichshafen AG, Friedrichshafen (DE)

(72) Inventors: Clemens Moser, Mittelberg (AT); Mario Hasel, Wangen (DE); Alexander Haberstock, Ravensburg (DE); Anshuman Deshpande, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 35 days.

(21) Appl. No.: 18/342,295

(22) Filed: Jun. 27, 2023

(65) Prior Publication Data

US 2023/0417320 A1    Dec. 28, 2023

(30) Foreign Application Priority Data

Jun. 28, 2022  (DE) ...................... 10 2022 206 487.9

(51) Int. Cl.
  *F16H 61/00* (2006.01)
(52) U.S. Cl.
  CPC . *F16H 61/0028* (2013.01); *F16H 2061/0037* (2013.01)
(58) Field of Classification Search
  CPC ......... F16H 61/0028; F16H 2061/0037; F16H 61/0025; F16H 61/0031; F16H 61/4008; F16H 61/0206; F16H 63/40
  See application file for complete search history.

(56) References Cited

U.S. PATENT DOCUMENTS

| 7,972,241 | B2 | 7/2011 | Schiele et al. |
| 2017/0307065 | A1* | 10/2017 | Buchmann .......... F16H 57/0439 |
| 2020/0292052 | A1* | 9/2020 | Hasel .................. F16H 61/0028 |
| 2022/0389944 | A1* | 12/2022 | Hironaka ................ F04C 2/344 |

FOREIGN PATENT DOCUMENTS

| DE | 102005028848 A1 | 1/2007 |
| DE | 102019204277 A1 | 10/2020 |
| DE | 102019215840 A1 | 4/2021 |

OTHER PUBLICATIONS

German Search Report DE 10 2022 206 487.9, dated Jan. 18, 2023. (12 pages).

* cited by examiner

*Primary Examiner* — Tisha D Lewis
(74) *Attorney, Agent, or Firm* — Dority & Manning, P.A.

(57) ABSTRACT

A method for operating a motor vehicle having a transmission including a hydraulic system with a dual-circuit pump includes driving the dual-circuit pump by both an internal combustion engine and an electric machine via a superposition gear unit that superimposes a rotational speed of the internal combustion engine and a rotational speed of the electric machine. The method further includes determining whether a subset is less than a subset threshold value when a target value of a required primary flow increases in a dual-circuit operating state to a value higher than a current primary flow actual value, with the subset being a difference between the target value and the current primary flow actual value. Additionally, the method includes increasing the second rotational speed of the electric machine when the subset is less than the subset threshold value.

11 Claims, 2 Drawing Sheets

METHOD AND CONTROL DEVICE FOR OPERATING A TRANSMISSION

CROSS-REFERENCE TO RELATED APPLICATION

The present application is related and has right of priority to German Patent Application No. 10 2022 206 487.9 filed on Jun. 28, 2022, the entirety of which is incorporated by reference for all purposes.

FIELD OF THE INVENTION

The invention relates generally to a method and a control device for operating a transmission of a motor vehicle.

BACKGROUND

A drive train of a motor vehicle includes a prime mover, a transmission, and a drive output. The transmission is arranged between the prime mover and the drive output as viewed with respect to the course of the power flow. The transmission converts rotational speeds and torques and, in this way, provides the available tractive force of the prime mover at the drive output in a suitable way. In a conventional motor vehicle, the prime mover is formed as an internal combustion engine. When the motor vehicle is a hybrid vehicle, the prime mover is formed from a combination of an internal combustion engine and an electric machine.

Transmissions known from practical experience typically include multiple shift elements. These shift elements are friction-locking shift elements, such as, for example, dogs, clutches, or brakes. In every shift condition, a defined first number of these shift elements is engaged and a defined second number of these shift elements is disengaged.

In order to disengage and engage the shift elements of the transmission and/or to keep the shift elements of the transmission disengaged and engaged, the shift elements are actuated with a defined hydraulic pressure, which is provided by a hydraulic system of the transmission.

In order to provide the pressure for the hydraulic fluid and/or the flow amount of the hydraulic fluid, a dual-circuit pump is used in modern motor vehicles. The dual-circuit pump is coupled to an internal combustion engine and an electric machine via a superposition gear unit in order to drive the dual-circuit pump by superimposing the rotational speeds of the internal combustion engine and the electric machine. This electric machine is not an electric machine of a prime mover, but rather an additional electric machine for driving the dual-circuit pump. Such a dual-circuit pump, which is driven via a superposition gear unit, is also referred to as a power-split dual-circuit pump. The dual-circuit pump has a primary flow having a primary delivery rate and a secondary flow having a secondary delivery rate.

A hydraulic system of a transmission has a primary circuit and a secondary circuit. The primary circuit is used for the pressure actuation of the shift elements of the transmission. The secondary circuit is used to cool and lubricate assemblies of the transmission. The hydraulic pump of the hydraulic system interacts with a system pressure valve of the hydraulic system such that, initially, all the oil that is delivered by the hydraulic pump is delivered into the primary circuit of the hydraulic system until a target primary circuit pressure or a target system pressure has been reached in the primary circuit. Only once this has taken place can an excess amount of oil or an excess volumetric flow of oil be delivered into the secondary circuit of the hydraulic system via the system pressure valve. When a target secondary circuit pressure has also been reached in the secondary circuit, an excess volumetric flow of oil is returned toward a suction loading of the particular pump.

The hydraulic system, more precisely, the particular hydraulic pump thereof, must be able to provide a requested pressure of a hydraulic fluid, usually of a hydraulic oil, in the hydraulic system under all operating conditions. This is particularly applicable for the primary circuit of the hydraulic system to be able to supply the shift elements of the transmission with sufficient hydraulic fluid and, in this way, carry out gear changes in accordance with the design or arrangement of the transmission. Otherwise, the shift elements of the transmission could possibly no longer be engageable or kept engaged, whereby the power flow in the transmission would then be interrupted.

However, these specifications of the hydraulic system do not always result in an ideal operation of the transmission. Improvements would be desirable especially regarding the energy balance and the execution of the change-over between a single-circuit operating state, i.e., where the primary flow and the secondary flow in combination cover the demand in the primary circuit and in the secondary circuit, and a dual-circuit operating state, i.e., where the primary flow covers the demand in the primary circuit separately from the secondary flow, which covers the demand in the secondary circuit.

SUMMARY OF THE INVENTION

Accordingly, an improved method for operating a motor vehicle having a transmission and a control system for carrying out the method are provided.

According to a first aspect, a method for operating a motor vehicle having a transmission is provided, where the transmission has a hydraulic system for supplying hydraulic oil and including a dual-circuit pump having a primary flow and a secondary flow, a system pressure valve, a lubricating valve, a primary circuit, and a secondary circuit. The dual-circuit pump is drivable by the internal combustion engine and an electric machine via an intermediate connection of a superposition gear unit at a resultant pump speed. More particularly, the superposition gear unit superimposes a first rotational speed of an internal combustion engine and a second rotational speed of an electric machine to provide the resultant pump speed. In a dual-circuit operating state, when a target value of a required primary flow increases from a first primary flow target value to a second primary flow target value, with the second primary flow target value being higher than a current primary flow actual value, a control device ascertains whether a subset, which results from a difference between a second primary flow target value and a primary flow actual value, does not exceed a subset threshold value. If the subset exceeds the subset threshold value, the control device increases the second rotational speed such that the primary flow actual value at least approximately corresponds to the second primary flow target value.

One effect is that a more stable system pressure is achievable by preventing a self-controlled switch between a single-circuit operation and a dual-circuit operation, and vice versa. Well-defined operating states of the pump system are required for a stable system pressure, and so a self-controlled switch of the dual-circuit pump is not desirable. In particular, excessively frequent switching between the single-circuit operating state and the dual-circuit operating state at the switch-over point is avoided, which switch-over point would otherwise set in, due to the pressure conditions, in a self-controlled manner.

For operating points close to the switch-over point between the single-circuit operating state and the dual-circuit operating state, a more stable operating state is brought about and a frequent switching back and forth is avoided by actuating the electric machine in a targeted manner, i.e., increasing the second rotational speed of the electric machine or "boosting" in the dual-circuit operation, reducing the second rotational speed, or switching off the electric machine.

Due to the improved definition of the operating points, the effects of manufacturing tolerances and wear, which can arise on the supply side, particularly with the vane pump, and also on the demand side, for example, with the pressure regulator or clutch leakages, are also reduced or suppressed. The pump system switches less often and, as a result, delivers a more stable system pressure over time.

In this context, the inventors have recognized, in particular, that the dual-circuit operating state is advantageous with respect to a stable system pressure, but that this loads the electric machine, which is considered to be uneconomical. Simply put, the inventors have recognized that, despite the advantage of the stable system pressure, it can nevertheless be preferred, in the overall view with respect to energy, to transition into the single-circuit operating state when the corresponding requirement on the electric machine is too great, i.e., the subset in the primary circuit, which would have to be compensated for via an increased rotational speed of the electric machine, is too great.

The subset threshold value can be selected between 1 liter/minute (liter/min) and 3 liters/min, preferably between 1.5 liters/min and 2.5 liters/min and, in particular, as at least approximately 2 liters/min. These values are advantageous, in particular, in a pump system having a maximum primary circuit demand between 15 liters/min and 35 liters/min, preferably between 20 liters/min and 30 liters/min and, in particular, of at least approximately 25 liters/min.

The distribution of the overall delivery volume of the dual-circuit pump between the primary flow and the secondary flow can be selected between 10:90 and 45:55, preferably between 25:75 and 43:57 and, in particular, as at least approximately 40:60.

In one preferred embodiment, when an increase arises in a dual-circuit operation, the control device furthermore ascertains whether the second primary flow target value is providable by increasing the second rotational speed of the electric machine and, only if so, increases the second rotational speed.

This embodiment additionally checks whether the electric machine—regardless of the check of the subset in relation to the subset threshold value—would be able to provide the increased primary flow target value, by increasing the second rotational speed. When this is also generally the case, special cases in marginal areas, for example, when the electric machine already has an increased rotational speed due to other determining factors, are identified.

In one further preferred embodiment, when the result of the ascertainment by the control device is negative, the hydraulic system is switched to the single-circuit operating state.

In this embodiment, therefore, there is no wait for the hydraulic system to transition into the single-circuit operating state due to the changing pressure conditions. Instead, the hydraulic system is actively switched into the single-circuit operating state because the current (increased) primary flow target value is effectively achieved in this way.

In one further preferred embodiment, in a dual-circuit operating state, when the target value of the required primary flow drops from the second primary flow target value to a third primary flow target value, the control device ascertains whether the third primary flow target value is providable by reducing the second rotational speed of the electric machine and, if so, reduces the second rotational speed such that the primary flow actual value at least approximately corresponds to the third primary flow target value.

In this embodiment, in the dual-circuit operating state, in particular when the second rotational speed of the electric machine has been increased, a check is carried out to determine whether the second rotational speed can be reduced, wherein the reduced primary flow target value must be reached. If this is the case, the second rotational speed is appropriately reduced.

In one further preferred embodiment, the hydraulic system is switched from the single-circuit operating state into a dual-circuit operating state when a subset of the primary flow that exceeds a subset threshold value is ascertained in the primary circuit.

This embodiment supports well-defined operating states. A waiting period ensues until a sufficient excess amount has set in before there is a switch back into the dual-circuit operating state. The subset threshold value can be selected between 0.2 liter/min and 1 liter/min, preferably between 0.4 liter/min and 0.7 liter/min and, in particular, as at least approximately 0.5 liter/min. These values are advantageous, in particular, in a pump system having a maximum primary circuit demand between 15 liters/min and 35 liters/min, preferably between 20 liters/min and 30 liters/min and, in particular, of at least approximately 25 liters/min.

In one further preferred embodiment, the second rotational speed of the electric machine is reduced, in particular to zero, once the single-circuit operating state has been assumed.

This embodiment is considered to be particularly economical. Since the switch into the single-circuit operating state has already taken place, the rotational speed of the electric machine can then be reduced or entirely shut off in order to increase overall efficiency.

In one further preferred embodiment, when the primary flow actual value is higher than a current target value of a required primary flow, a flow of excess hydraulic fluid is delivered from the primary circuit into the secondary circuit.

This embodiment makes it possible to cover a portion of the secondary flow target value required in the secondary circuit from the primary flow in the primary circuit.

In one further preferred embodiment, when a secondary flow actual value is higher than a current target value of a required secondary flow, a flow of excess hydraulic fluid is delivered from the secondary circuit into a suction loading of the dual-circuit pump.

This embodiment makes it possible to return the excess hydraulic fluid flow of the secondary circuit into the suction loading of the dual-circuit pump when the primary flow target value required in the primary circuit and the secondary flow target value required in the secondary circuit are covered.

In one further preferred embodiment, each of the flow variables describes a volumetric flow of the hydraulic fluid or a pressure of the hydraulic fluid.

A person skilled in the art has the choice as to how to describe the flow variables, in particular a primary flow actual value, a primary flow target value, a secondary flow actual value, and a secondary flow target value. Depending on the application or a specific operating situation, a description as volume, a description as pressure, or a description in combination of volume and pressure is advantageous.

The problem is also solved according to a second aspect of the invention by a control device of a motor vehicle, which carries out the above-described method.

It is understood that the features of the invention, which are mentioned above and which will be described in greater detail in the following, are usable not only in the particular combination indicated, but rather also in other combinations or alone, without departing from the scope of the invention.

BRIEF DESCRIPTION OF THE DRAWINGS

Further features and advantages of the invention become clear from the following description of preferred exemplary embodiments with reference to the drawings, in which.

DETAILED DESCRIPTION

Figure 1:
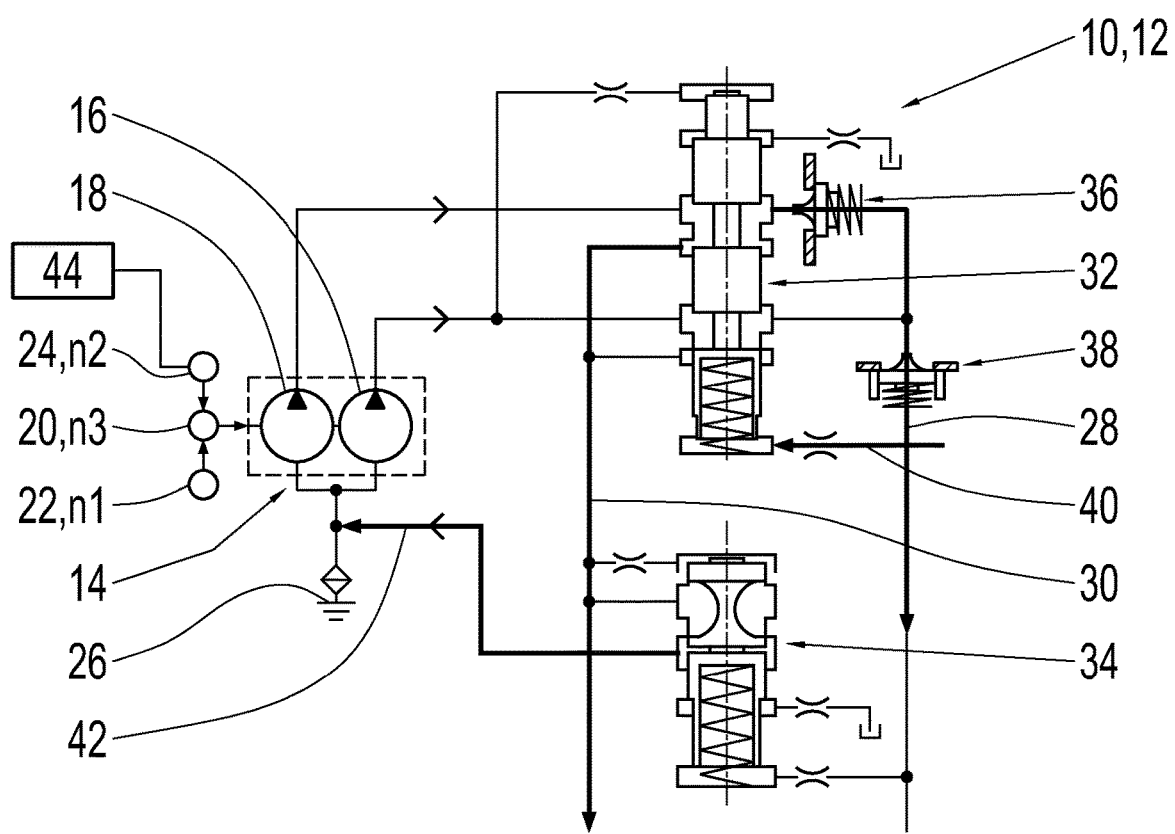
FIG. 1 shows a detailed schematic view of one exemplary embodiment of a hydraulic system of a transmission of the motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a partial schematic view of a transmission 10 of a motor vehicle, more precisely, illustrating a hydraulic system 12 of the transmission 10. The hydraulic system 12 of the transmission 10 is used to pressurize shift elements of the transmission 10 and lubricate and cool assemblies of the transmission 10.

A dual-circuit pump 14 is used in the hydraulic system 12 in FIG. 1 to provide a primary flow 16 and a secondary flow 18. More particularly, the flows 16, 18 of the dual-circuit pump 14 are provided via pressure chambers of the dual-circuit pump 14, each of which delivers a delivery rate or a delivery volume of the dual-circuit pump 14. For instance, the primary flow 16 provides a primary delivery rate or a primary delivery volume, whereas the secondary flow 18 provides a secondary delivery rate or a secondary delivery volume of the dual-circuit pump 14.

The dual-circuit pump 14 is drivable by an internal combustion engine 22, which has a first rotational speed n1, and by an electric machine 24, which has a second rotational speed n2, preferably via a superposition gear unit 20 having a planetary gear set. More particularly, at the superposition gear unit 20, a first rotational speed n1 of the internal combustion engine 22 and a second rotational speed n2 of the electric machine 24 are superimposed in order to drive the dual-circuit pump 14 of the hydraulic system 12 at a resultant pump speed n3.

A dual-circuit pump 14 of this type is also referred to as a power-split pump, as mentioned above. The power split is implemented via the superimposition of the power from the internal combustion engine 22 and the power from the electric machine 24. The power of the internal combustion engine 22 and the power of the electric machine 24 are essentially determined by the rotational speed of the particular assembly.

The dual-circuit pump 14 is preferably implemented as a vane pump, in particular having an eccentrically arranged vane. A geometry of this type makes it possible for the primary flow 16 to exit the dual-circuit pump 14 at a higher pressure than the secondary flow 18. For this purpose, the delivered volume of the secondary flow 18, as the secondary delivery rate, is greater than the primary flow 16, i.e., the primary delivery rate.

The dual-circuit pump 14 scavenges a hydraulic fluid, specifically oil in this case, from an oil sump 26, where the oil scavenged from the oil sump 26 by the dual-circuit pump 14 is delivered into a primary circuit 28 and into a secondary circuit 30 of the hydraulic system 12. The primary circuit 28 supplies the shift elements of the transmission 10 with hydraulic fluid in order to engage the shift elements of the transmission 10 or to keep these engaged. The secondary circuit 30 is used to cool and lubricate assemblies of the transmission 10.

The dual-circuit pump 14 of the hydraulic system 12 interacts with a system pressure valve 32 and a lubricating valve 34 in order to convey the hydraulic fluid delivered by the dual-circuit pump 14 toward the primary circuit 28 and/or toward the secondary circuit 30 and to supply the hydraulic fluid into the primary circuit 28 and/or the secondary circuit 30.

When the pump speed n3 for operating the dual-circuit pump 14 is relatively low, a volumetric flow of oil provided by the dual-circuit pump 14 due to this relatively low pump speed n3 provides a pressure that is less than a target primary circuit pressure or a target system pressure influenced via a pilot pressure 40. As such, the volumetric flow of the primary flow 16 and of the secondary flow 18 of the dual-circuit pump 14 are delivered exclusively and completely into the primary circuit 28, specifically when the system pressure valve 32, acting as a pressure limiting valve, is in an appropriate switching position. Check valves 36, 38 prevent a return flow of oil from the primary circuit 28 toward the primary flow 16 and the secondary flow 18 of the dual-circuit pump 14, respectively.

Figure 2:
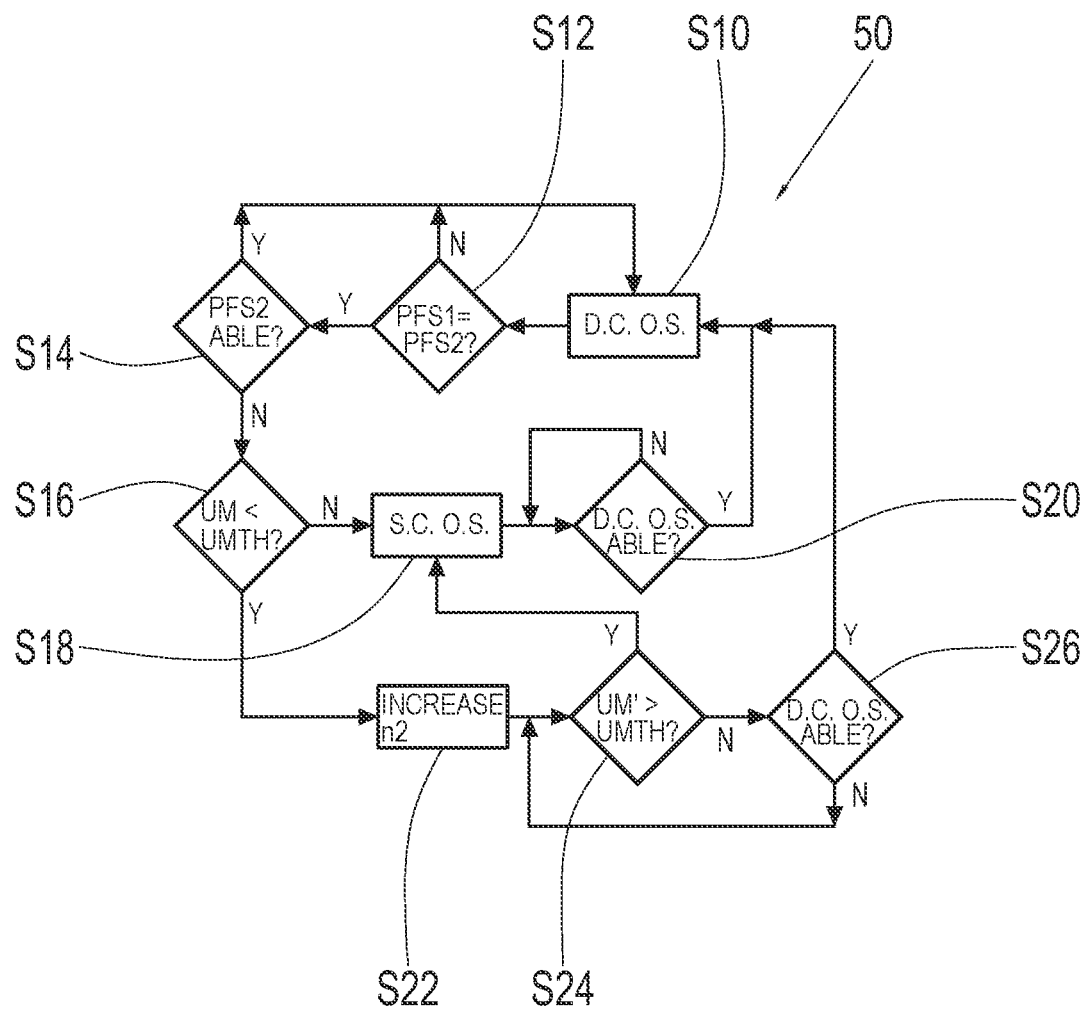
FIG. 2 shows a block diagram of one exemplary embodiment of a method for operating the hydraulic system of FIG. 1.

FIG. 2 shows a block diagram of one exemplary embodiment of a method 50 for operating the hydraulic system of FIG. 1. It is assumed, by way of example, that the hydraulic system 12 is in the dual-circuit operating state (D.C. O.S.) at step S10. In step S12, a check is carried out to determine whether a required first primary flow target value PFS1 has increased, such as to a second primary flow target value PFS2. If the first primary flow target value PFS1 has not increased, the method 50 branches via the branch N back to the step S10.

If the first primary flow target value PFS1 has increased to a second primary flow target value PFS2, a check is carried out in the step S14 to determine whether the second primary flow target value PFS2 is still fulfillable with a current primary flow actual value PFI. If the second primary flow target value PFS2 is still fulfillable with the current primary flow actual value PFI, the method 50 branches via the branch Y back to the step S10.

If the second primary flow target value PFS2 is not fulfillable with the current primary flow actual value PFI, however, a check is carried out in the step S16 to determine whether a subset UM, which results from a difference between the second primary flow target value PFS2 and the primary flow actual value PFI, i.e., UM=PFS2−PFI, does not exceed a subset threshold value UMTH. If the subset UM is greater than the subset threshold value UMTH, the method 50 branches via the branch N to the step S18, otherwise, if the subset UM is less than the subset threshold value UMTH, the method 50 branches via the branch Y to the step S22.

In the step S18, the single-circuit operating state (S.C. O.S.) is activated. In the subsequent step S20, a check is carried out to determine whether conditions have been met for a return to the dual-circuit operating state. For example, when a subset threshold value OMTH of the primary flow 16 in the primary circuit 28 is exceeded, the method 50 branches via the branch Y back to the step S10. Otherwise, the step S20 is carried out again via the branch N.

In the step S22, the dual-circuit operating state is retained and the second rotational speed n2 of the electric machine 24 is increased such that the primary flow actual value PFI at least approximately corresponds to the second primary flow target value PFS2.

In the subsequent step S24, a check is carried out to determine if a situation similar to the step S16 has set in, possibly due to a changed third primary flow target value PFS3, which is lower than the second primary flow target value PFS2. Specifically, it is checked at S24 whether a subset UM', which results from a difference between the third primary flow target value PFS3 and the primary flow actual value PFI, i.e., UM'=PFS3−PFI, exceeds the subset threshold value UMTH.

If the subset UM' is greater than the subset threshold value UMTH, the method 50 branches via the branch Y to the step S18, where the single-circuit operating state is activated. Otherwise, if the subset UM' is less than the subset threshold value UMTH, the method 50 branches via the branch N to step S26 and carries out a check to determine whether the conditions have been met for a return to the dual-circuit operating state. If these conditions have been met, the method 50 branches via the branch Y back to the step S10. Otherwise, if these conditions have not been met, the method 50 branches via the branch N back to the step S24.

The invention also relates to a control device 44 for carrying out the method according to the invention. This control device 44 is, in particular, a transmission control unit. For this purpose, the control device 44 has at least data interfaces for exchanging data with the assemblies contributing to the execution of the method according to the invention, such as, for example, with the electric motor 24. The control device 44 also includes a processor for data processing and a memory for data storage. In addition, program modules are stored in the control device 44, which are used to carry out the method according to the invention.

In principle, the presented concept and the presented control device are also applicable to other pump systems, for example, to pump systems having an additional pump which provides an additional volumetric flow for supplying hydraulic fluid, wherein the additional pump is then activated in a corresponding way, i.e., (like the preceding explanations), where the second rotational speed of the electric machine is increased.

In addition, the presented concept and the presented control device are also applicable to single-circuit pump systems. The advantage is then being able to boost, with this function, via the additional pump system, i.e., to be able to achieve a rapid increase in the flow when, according to calculations, an undersaturation in the primary circuit is imminent.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

10 transmission
12 hydraulic system
14 dual-circuit pump
16 primary flow
18 secondary flow
20 superposition gear unit
22 internal combustion engine
24 electric machine
26 oil sump
28 primary circuit
30 secondary circuit
32 system pressure valve
34 lubricating valve
36 check valve
38 check valve
40 pilot pressure
42 suction loading
44 control device
n1 rotational speed of the internal combustion engine
n2 rotational speed of the electric machine
n3 pump speed

The invention claimed is:

1. A method for operating a motor vehicle having a transmission (10), an internal combustion engine (22), and an electric machine (24), the transmission (10) having a hydraulic system (12) for supplying hydraulic fluid, the hydraulic system (12) including a dual-circuit pump (14) having a primary flow (16) and a secondary flow (18), the hydraulic system (12) further including a system pressure valve (32), a lubricating valve (34), a primary circuit (28), and a secondary circuit (30), the method comprising:
    driving the dual-circuit pump (14) by the internal combustion engine (22) and the electric machine (24) at a resultant pump speed (n3) via an intermediate connection of a superposition gear unit (20), the superposition gear unit (20) superimposing a first rotational speed (n1) of the internal combustion engine (22) and a second rotational speed (n2) of the electric machine (24) to provide the resultant pump speed (n3);
    determining, with a control device (44), whether a subset (UM) is less than a subset threshold value (UMTH) when a target value of a required primary flow (16) increases from a first primary flow target value (PFS1) to a second primary flow target value (PFS2) in a dual-circuit operating state, the second primary flow target value (PFS2) being higher than a current primary flow actual value (PFI), the subset being a difference between the second primary flow target value (PFS2) and the primary flow actual value (PFI); and
    increasing, with the control device (44), the second rotational speed (n2) when the subset (UM) is less than the subset threshold value (UMTH) such that the primary flow actual value (PFI) corresponds to the second primary flow target value (PFS2).

2. The method of claim 1, further comprising determining, with the control device (44), when the target value of the required primary flow (16) increases in the dual-circuit operating state, whether the second primary flow target value (PFS2) is providable by increasing the second rotational speed (n2) of the electric machine (24), wherein increasing, with the control device (44), the second rotational speed (n2) when the subset (UM) is less than the subset threshold value (UMTH) comprises increasing, with the control device (44) the second rotational speed (n2) when the subset (UM) is less than the subset threshold value (UMTH) only when the second primary flow target value (PFS2) is providable by increasing the second rotational speed (n2) of the electric machine (24).

3. The method of claim 1, further comprising switching, with the control device (44), the hydraulic system (12) into a single-circuit operating state when the subset (UM) is greater than the subset threshold value (UMTH).

4. The method of claim 3, further comprising switching, with the control device (44), the hydraulic system (12) from the single-circuit operating state into the dual-circuit operating state when the subset of the primary flow (16) exceeds another subset threshold value (OMTH) in the primary circuit (26).

5. The method of claim 3, further comprising reducing, with the control device (44), the second rotational speed (n2) of the electric machine (24) once the single-circuit operating state is assumed.

6. The method of claim 5, wherein reducing the second rotational speed (n2) of the electric machine (24) once the single-circuit operating state is assumed comprises reducing the second rotational speed (n2) of the electric machine (24) to zero.

7. The method of claim 1, further comprising:

determining, with the control device (44) whether a third primary flow target value (PFS3) is providable by reducing the second rotational speed (n2) of the electric machine (24) when the target value of the required primary flow (16) drops from the second primary flow target value (PFS2) to the third primary flow target value (PFS3) in the dual-circuit operating state; and reducing, with the control device (44), the second rotational speed (n2) when the third primary flow target value (PFS3) is providable by reducing the second rotational speed (n2) of the electric machine (24) such that the primary flow actual value (PFI) corresponds to the third primary flow target value (PFS3).

8. The method of claim 1, wherein, when the primary flow actual value (PFI) is higher than the target value of the required primary flow (16), a flow of excess hydraulic fluid is delivered from the primary circuit (28) into the secondary circuit (30).

9. The method of claim 1, wherein, when an actual value of the secondary flow is higher than a target value of a required secondary flow (18), a flow of excess hydraulic fluid is delivered from the secondary circuit (30) into a suction loading (42) of the dual-circuit pump (14).

10. The method of claim 1, wherein each of the subset (UM), the subset threshold value (UMTH), the required primary flow (16), the first primary flow target value (PFS1), the second primary flow target value (PFS2), and the primary flow actual value (PFI) describes a respective volumetric flow of the hydraulic fluid or a respective pressure of the hydraulic fluid.

11. A vehicle control device (44) of a motor vehicle having a transmission (10), an internal combustion engine (22), and an electric machine (24), the transmission (10) having a hydraulic system (12) for supplying hydraulic fluid, the hydraulic system (12) including a dual-circuit pump (14) having a primary flow (16) and a secondary flow (18), the hydraulic system (12) further including a system pressure valve (32), a lubricating valve (34), a primary circuit (28), and a secondary circuit (30), the vehicle control device (44):

drives the dual-circuit pump (14) by the internal combustion engine (22) and the electric machine (24) at a resultant pump speed (n3) via an intermediate connection of a superposition gear unit (20), the superposition gear unit (20) superimposing a first rotational speed (n1) of the internal combustion engine (22) and a second rotational speed (n2) of the electric machine (24) to provide the resultant pump speed (n3);

determines whether a subset (UM) is less than a subset threshold value (UMTH) when a target value of a required primary flow (16) increases from a first primary flow target value (PFS1) to a second primary flow target value (PFS2) in a dual-circuit operating state, the second primary flow target value (PFS2) being higher than a current primary flow actual value (PFI), the subset being a difference between the second primary flow target value (PFS2) and the primary flow actual value (PFI); and increases the second rotational speed (n2) when the subset (UM) is less than the subset threshold value (UMTH) such that the primary flow actual value (PFI) corresponds to the second primary flow target value (PFS2).

* * * * *